US007938926B2

(12) United States Patent
Hughes et al.

(10) Patent No.: US 7,938,926 B2
(45) Date of Patent: May 10, 2011

(54) MANUFACTURE OF A FILTERING SYSTEM

(75) Inventors: Andrew Hughes, Edinburgh (GB); Morton Barrowmore Auld, Edinburgh (GB)

(73) Assignee: United Wire Limited, Edinburgh (GB)

( * ) Notice: Subject to any disclaimer, the term of this patent is extended or adjusted under 35 U.S.C. 154(b) by 769 days.

(21) Appl. No.: 11/923,745

(22) Filed: Oct. 25, 2007

(65) Prior Publication Data

US 2008/0142155 A1 Jun. 19, 2008

Related U.S. Application Data

(62) Division of application No. 10/473,262, filed on Aug. 3, 2004, now Pat. No. 7,306,022.

(51) Int. Cl.
*B32B 37/00* (2006.01)

(52) U.S. Cl. ......... 156/163; 156/160; 156/164; 156/229

(58) Field of Classification Search .................. 156/160, 156/163, 164, 229
See application file for complete search history.

(56) References Cited

U.S. PATENT DOCUMENTS 3,414,994 A 12/1968 Jaccard
4,568,455 A * 2/1986 Huber et al. .................. 209/405
5,096,524 A 3/1992 Ohtani
5,740,732 A 4/1998 Karlyn
6,237,780 B1 5/2001 Schulte
6,431,368 B1 8/2002 Carr
6,561,089 B1 5/2003 Newman

FOREIGN PATENT DOCUMENTS

GB 2337019 A 11/1999
GB 2382032 A 5/2003

* cited by examiner

*Primary Examiner* — Jeff H Aftergut
(74) *Attorney, Agent, or Firm* — Barnes & Thornburg LLP

(57) ABSTRACT

In a method of and apparatus for manufacturing a filtering screen, a frame of plastics coated metal or reinforced plastics material is located in a jig and at least two sheets of wire cloths are placed over the frame and their edges gripped by pneumatically operated clamps carried by the jig. The clamps are pneumatically driven outwardly of the frame to tension each cloth in orthogonal directions. The tensioned cloths are pressed against the frame and heated in order to bond the cloths to the frame. The heated material is allowed to cool, and after completion of the bonding step the clamps a released, allowing the frame to be removed from the jig. Where necessary the cloths are trimmed back to the edges of the frame. A separate set of pneumatically operated clamps may be provided for gripping all four edges of each wire cloth layer to allow each layer to be individually tensioned.

10 Claims, 18 Drawing Sheets

MANUFACTURE OF A FILTERING SYSTEM

RELATED APPLICATION

This application is a divisional of U.S. patent application Ser. No. 10/473,262, filed Aug. 3, 2004, and now U.S. Pat. No. 7,306,022.

FIELD OF THE INVENTION

This invention relates to a method of manufacturing a filter screen, apparatus for manufacturing a filter screen and a filter screen when manufactured by said method and/or apparatus. The invention is especially concerned with filter screens for use as filters in vibrating filtration equipment such as shakers which are used in the oil drilling industry for separating solids from the liquid phase of oil and water based muds retrieved from drilling operations.

PRIOR ART

An example of such a filter screen is described in Patent Specification No WO95/23655. This screen has upper and lower wire mesh cloths of differing qualities stretched over a metal rod reinforced frame of plastics material to which the cloths, after tensioning, are bonded by adhesive. Later Patent Specification No. WO98/37988 describes a frame to which the tensioned cloths can be bonded by heat softening the surface of the frame and pressing relevant parts of the cloths into the softened plastics material, the bond being completed by then allowing the plastics material to cool and cure.

THE INVENTION

According to one aspect of the invention there is provided a method of manufacturing a filtering screen according to which a frame of plastics coated metal or reinforced plastics material is located in a jig, at least one wire mesh cloth is placed over the frame and its edges are gripped by pneumatically operated clamps carried by the jig, the clamps are pneumatically driven outwardly of the frame to tension the cloth in orthogonal directions, the tensioned cloth is pressed against the frame by a heated platen in order to bond the cloth to the frame and after completion of the bonding step the clamps are released, the frame is removed from the jig and where necessary the cloth trimmed back to the edges of the frame.

According to another aspect of the invention, there is provided apparatus for manufacturing a filtering screen comprising a jig for locating at least one frame of plastics coated metal or reinforced plastics material, pneumatically operated clamps carried by the jig for gripping the edges of a metal wire mesh cloth placed over the at least one frame, pneumatically driven tensioning means on the jig for driving the clamps outwardly from the frame to tension the cloth in orthogonal directions, a platen, means for heating the platen, means for driving the heated platen and/or the jig to press the cloth against the frame in order to locally melt the plastics material and allow the cloth to become embedded therein, and then to retract the platen and/or jig to allow the at least one frame and cloth to cool in order to bond the cloth to the frame, and to allow the frame then to be removed from the jig after release of the clamps.

The invention also relates to a filter screen manufactured by the above-described method and/or apparatus Preferably two or sometimes three layers of wire mesh cloth are bonded to the frame.

Typically a lower cloth of coarser mesh is located below a finer mesh cloth.

The plastics material of the frame is typically polypropylene.

The frame itself preferably has a rectangular shaped periphery with a lattice of intersecting bars. During the heating step, the plastics material forming the upper surface of the frame is softened and the tensioned cloths are pressed into the softened plastics material and become embedded therein. The bond is completed by allowing the frame to cool and the plastics material to cure. It is possible for the upper surface of the frame to be ridged to aid the bonding step, in that it is then only necessary for the heated platen used to press the cloths against the frame, to soften the ridges which then accept the wire mesh to form the bond.

It is most desirable to protect the cloth(s) from direct contact with the heated platen, and for this purpose a heat resistant non-stick fabric, such as PTFE glass fabric, is preferably laid over the cloths prior to the bonding step. The fabric is removed on completion of the bonding step.

When two, or occasionally possibly even three wire mesh cloths are to be incorporated into the screen, a separate set of pneumatically operated clamps is provided for each cloth. Similarly, a cloth tensioning mechanism is provided for the clamps along at least two adjacent sides, and preferably all four sides, of each cloth. The cloths can thus be individually and differentially tensioned as appropriate for the use to which the screen is to be put, prior to being collectively bonded to the frame.

Preferably, each clamp comprises a fixed pair of jaws and an inflatable envelope between them for use in gripping the edge of the wire mesh cloth. Thus the envelope, when inflated, may act to press a metal, typically aluminium, plate towards one of the fixed jaws, which is preferably lined with a rubber (or like material) strip, typically 3 cm wide, to improve the grip on the edge of the cloth sandwiched between the plate and the jaw.

A control panel is provided to enable a jig operator to activate the pneumatic clamps and the pneumatic tensioning means. Preferably four control panels are provided, so that the operator can feed the cloth into the clamps along one side of the frame and activate these clamps to clamp that edge of the cloth using one control panel, before moving to another side of the fame and repeating the procedure for that side of the frame, and so on. Where there are two or more levels of clamps and tensioning mechanisms, one level for each layer of cloth, the first cloth is individually clamped and tensioned on all four sides, and then the next, in a similar manner until all the cloths have been clamped and tensioned as appropriate.

According to a preferred feature of the invention the clamping and tensioning of the cloths is performed at a first station remote from a second station at which the bonding occurs. Pneumatic power for the clamps and tensioning mechanisms is therefore supplied to the jig through a flexible supply cable, in order to allow for the movement of the jig between the stations.

Initially, therefore, the at least one frame is loaded into a jig carried by a cradle which, after the cloths have been clamped and tensioned, is conveyed to the second station containing the heated platen.

The cradle preferably has wheels running on rails along which the cradle is driven between the first and second stations by a suitable drive mechanism, conveniently a Festo® linear pneumatic drive.

The jig cradle and the platen, which is preferably preheated, are then moved relatively vertically.

In one embodiment, the jig cradle is raised up to the platen by a hydraulic ram, to commence the bonding step. Thus, the ram may act against the underside of the cradle to lift it off the rails on which the cradle is driven between the first and second stations.

Where a non-stick fabric is to be placed on top of the cloth before it is engaged with the heated platen, the fabric is preferably placed on the cloth at the first station, although if preferred it can be added at the second station, or in transit.

Conveniently the platen may be pre-heated to a temperature in the range 200 to 300 degrees C., preferably about 250 degrees C.

Where a hydraulic ram is employed to elevate the cradle and then squeeze the mesh between the heated platen and the frame, a squeezing force is typically obtained using a hydraulic pressure applied to the ram in the range 500 to 2000 psi.

Preferably this hydraulic pressure is adjustable, for example to suit the screen materials, and in particular the cloth or cloth combinations used.

The hydraulic pressure to effect the squeeze and heating and bonding step is typically applied for a period of time in the range 30 seconds to 2 minutes.

At the end of the heating and bonding step, the jig cradle and platen are separated to allow the material to cool and cure, and finally the jig cradle is conveyed back from the second station to the clamping and tensioning station, to allow the operator to release the clamps, remove the protective fabric, remove the frame or frames from the jig cradle, and trim the cloths extending beyond the edges of the frame(s).

Other features which may be incorporated into the above-described method and apparatus are as follows.

Firstly, the clamping surfaces of the clamps may be sufficiently rough to prevent cloth slipping when the cloths are put under tension but smooth enough to prevent tearing of the cloths.

Secondly, a preferred method and apparatus handles two frames at a time, arranged side-by-side, and a single large area piece of wire mesh cloth, one for each layer, is stretched over both frames. After the bonding step the single piece of cloth is cut along a line between the two side-by-side frames. It will be appreciated that the jig cradle is thus relatively large, but the time taken to fit, clamp and tension each large sheet is little different from what would be required to similarly handle smaller areas of cloth over a single frame, and each heating and bonding step results in two screens instead of just one.

Thirdly, the clamps of any one layer can preferably be moved outwardly of the frame individually and independently of each other, i.e. each clamp has an associated tensioning mechanism, so that any localised slack in the cloth can be taken up.

Fourthly, a breaker bar may be located immediately in front of each tine of clamps along the sides of the frame, and the cloth moves over it as the cloths are tensioned, thereby to remove any ripples in the cloth.

DESCRIPTION OF EMBODIMENT

The invention is further described with reference to the accompanying drawings, in which:

FIG. 1 is a side elevational view of the filter screen manufacturing apparatus, FIG. 2 is a side view showing some internal detail of the apparatus when seen from a vertical longitudinal centre plane therethrough, FIG. 3 is an elevational view on the other side of the apparatus, FIG. 4 is an end view of the apparatus, FIG. 5 is a plan view of the apparatus, the jig being shown with a first frame located therein, FIG. 6 is an enlarged view of a longer side of the jig seen when viewing the end of the apparatus, FIG. 7 is an enlarged view of the frame to be located in the jig, FIG. 8 is an enlarged view of the jig with the first frame located therein, FIG. 9 is a view similar to that of FIG. 8 but after the two frames have been located in the jig, a wire mesh cloth, cut away in part, tensioned thereover, and a release paper, also cut away in part, laid over the cloth, FIG. 10 is a side view, further enlarged, of the pneumatic clamps on the jig, and FIGS. 10A and 10B illustrate the three sets of clamps along one side of the jig, ready to receive cloth edges (in 10A) and after being fully retracted (in 10B), such as when tensioning cloths (not shown)

Figure 1:
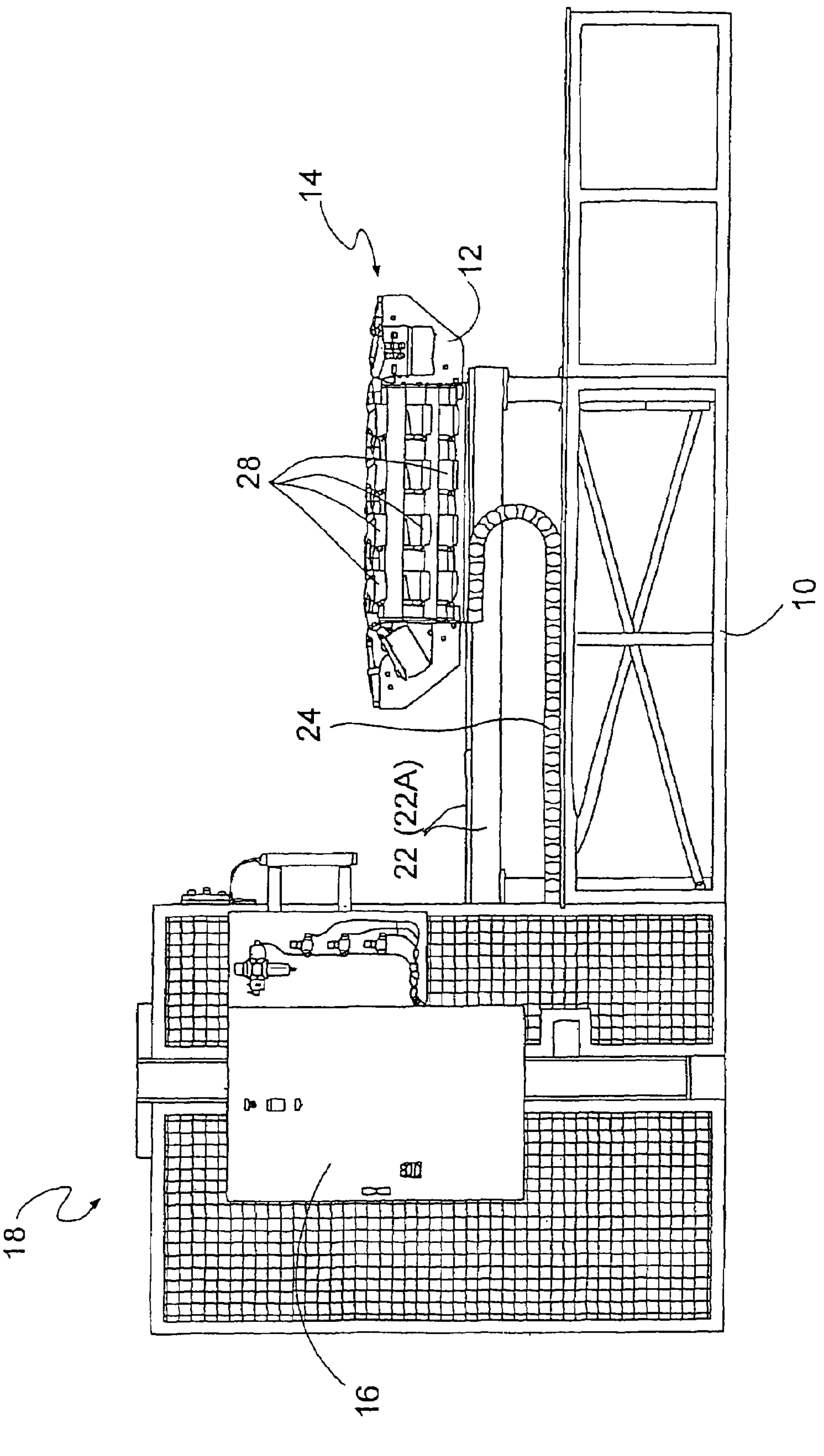

Referring to FIGS. 1 to 6, the illustrated apparatus comprises a supporting framework 10 which at one end supports a cradle 12 forming a jig for enabling assembly of screen frames at an assembly station 14, and which at the other end is integrated with a heating platen support unit 16 constituting a bonding station 18. The cradle 12 has wheels which run on parallel spaced apart rails 22, 22A to enable the cradle to be moved between the two stations by a drive 23 (see FIG. 3). At least one rail and the wheels corresponding therewith are designed to ensure that the cradle moves in a straight path.

Figure 3:
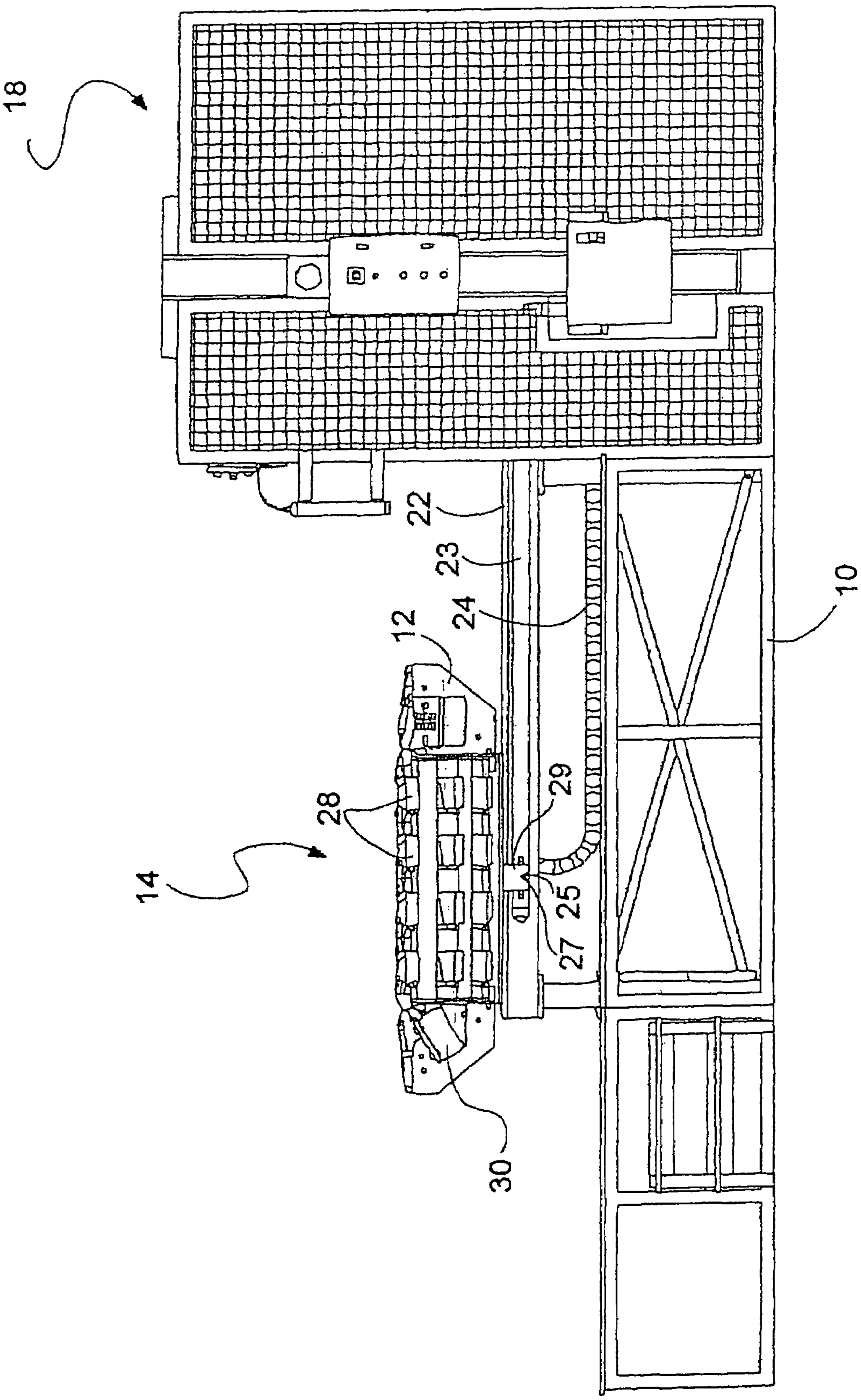
Figure 4:
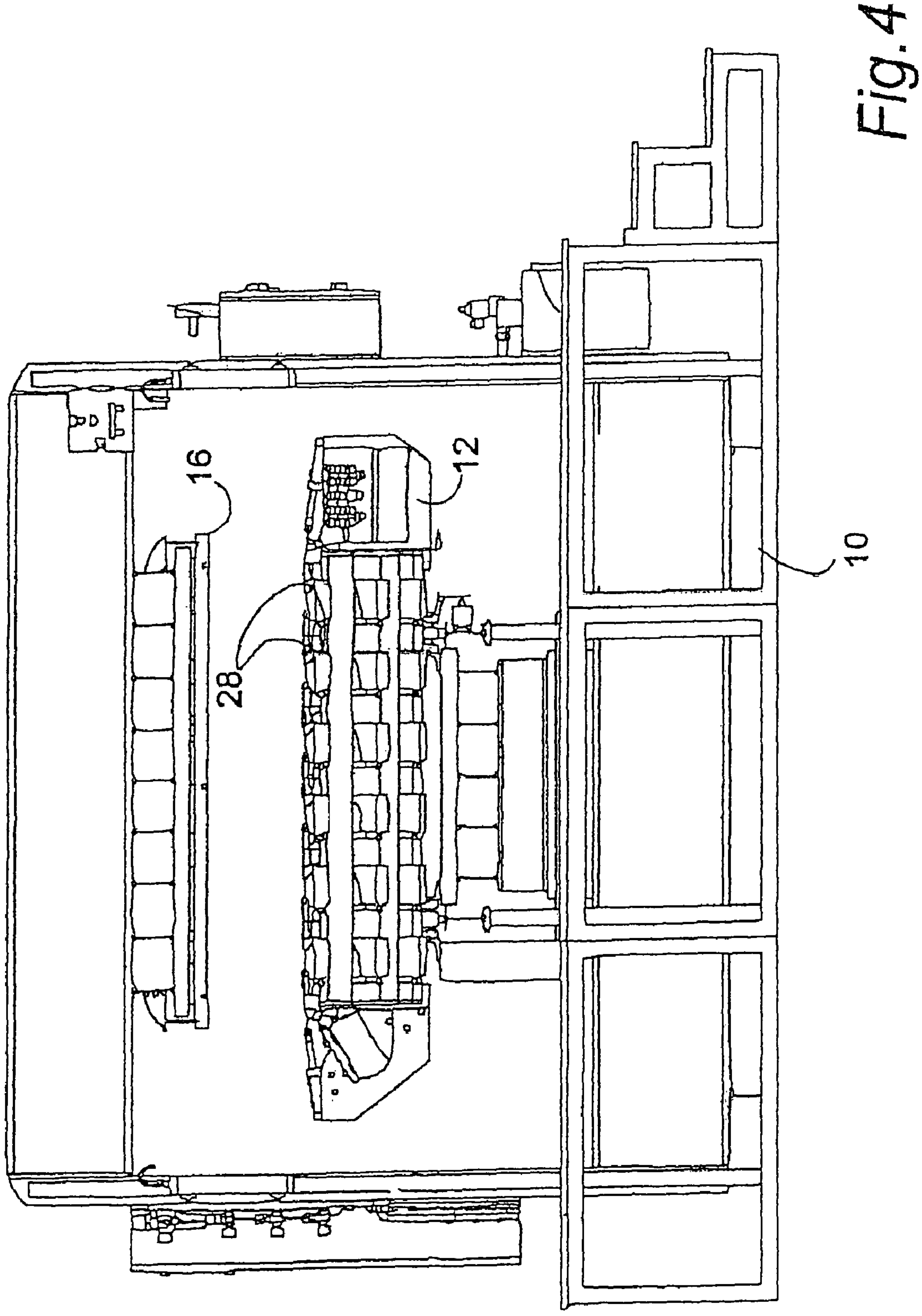

The drive includes a pin 25 which engages in a groove 27 in plate 29, which later is secured to and extends from the cradle (see FIG. 3). The drive 23 is a Festo® linear pneumatic drive.

A flexible services umbilical cord 24 conveys electrics and pneumatics to the cradle.

Figure 7:
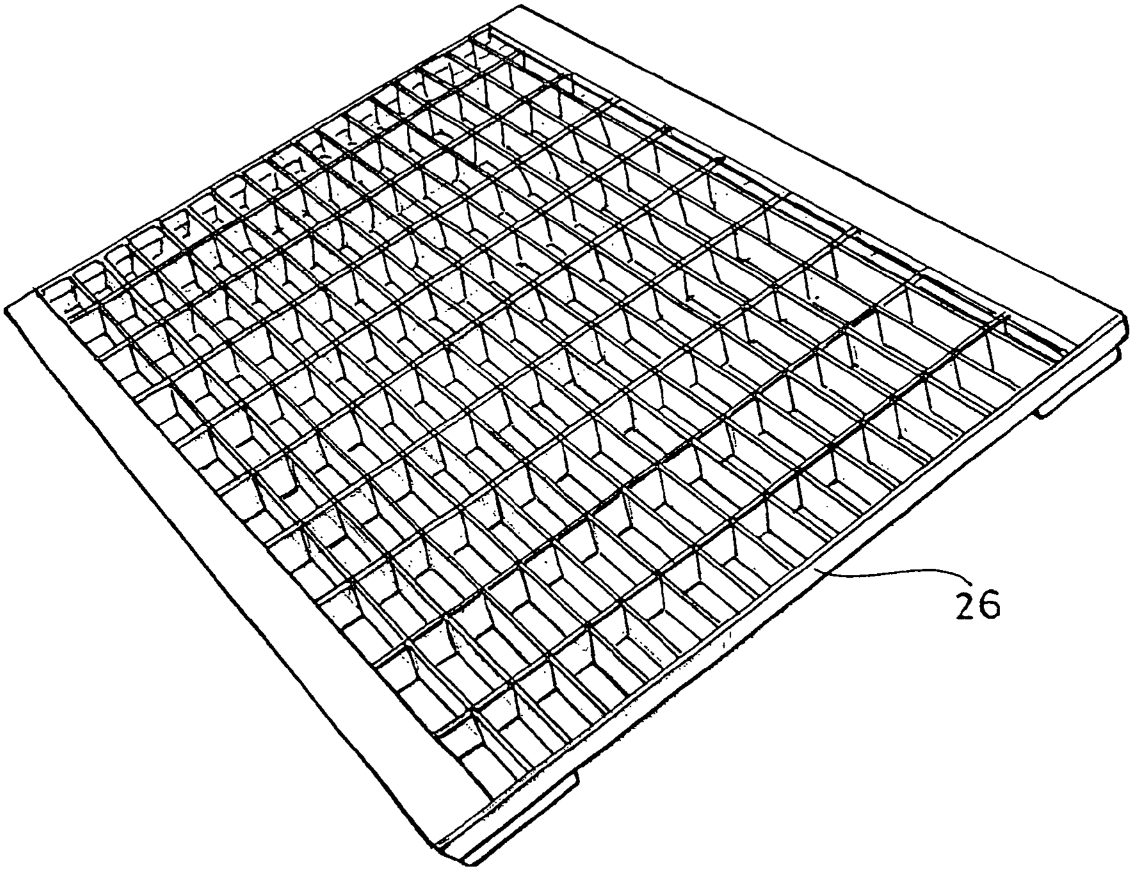
Figure 8:
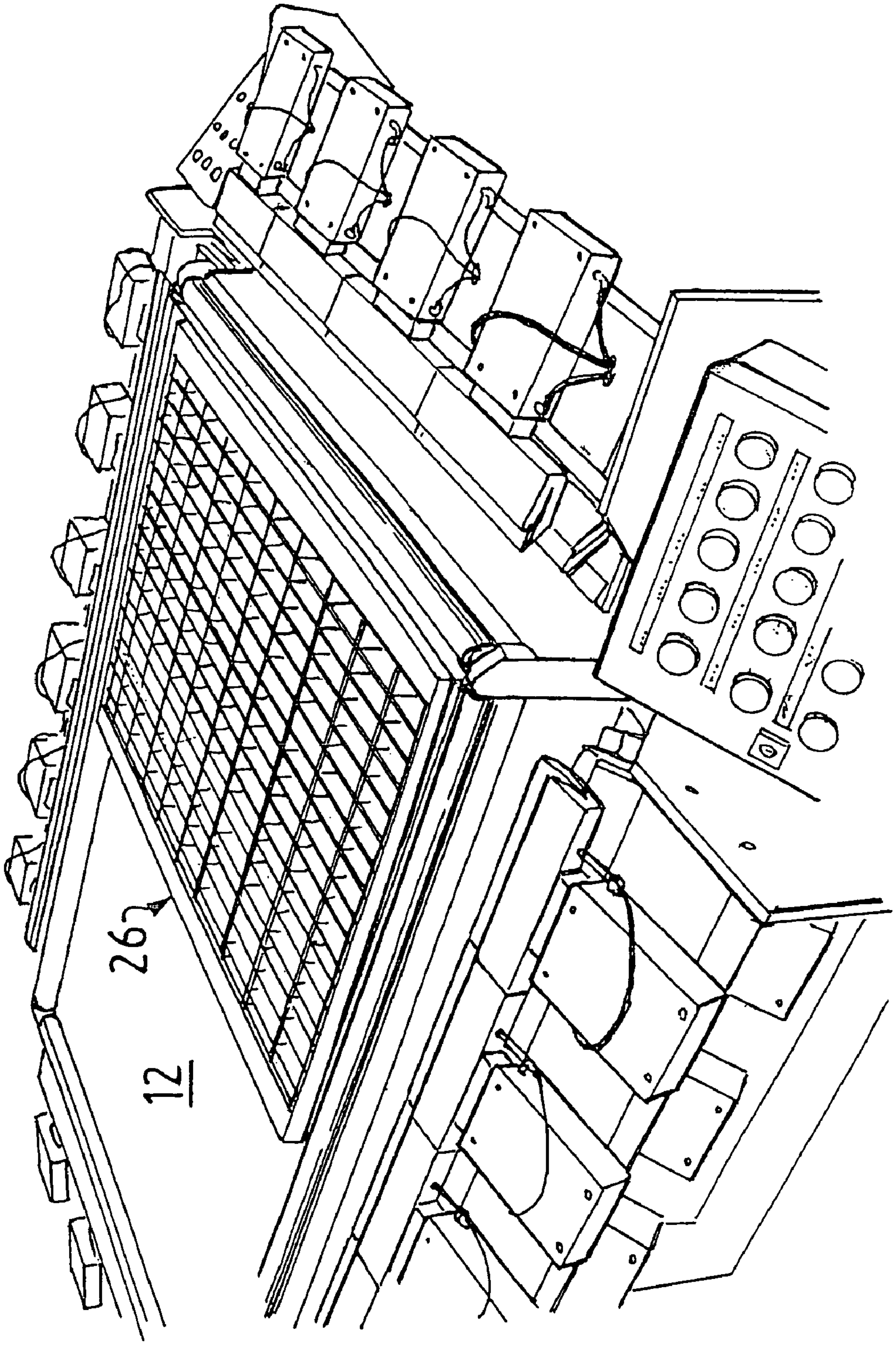

At the screen assembly station, two GRP screen support frames 26, one of which is shown in FIG. 7, are laid side by side in the jig cradle 12. FIG. 8 shows one of the frames 26 located in the cradle 12, with the space for a second frame 26 beside it. The plan view of the apparatus (FIG. 5) also shows one frame located in the jig. Each frame 26 comprises a rectilinear grid of orthogonally intersecting, wire reinforced glass fibre reinforced polypropylene bars as described in Patent Specifications WO95/23655 and WO98/37988. In known manner, the upper surfaces of the peripheral edges and intersecting bars of the frame are moulded with upstanding ridges.

Having located the two frames in the jig woven wire mesh filter cloths are laid in turn over the frames, and the edges of each cloth inserted into and gripped by pneumatic clamp units 28 carried by the jig before the next cloth is applied. The pneumatic clamp units are shown in more detail in FIG. 10.

Each clamp comprises fixed upper and lower jaws 28A, 28B the lower of which carries on its upwardly facing surface an inflatable envelope 28C over which, lies a protective aluminium plate 28D. A cloth edge is inserted between 28D and a rubber strip 28E on the underside surface of the upper jaw, so that when 28C is inflated the cloth is clamped between plate 28D and the upper jaw, the rubber strip 28E reducing the risk of slip occurring when the cloth is tensioned. In use, the edge of a wire cloth is pulled over the breaker bar 31 and inserted between the jaws 28A, 28B between the rubber strip and the aluminium plate. The envelope is then inflated to grip the cloth between the rubber strip and the plate with a pressure sufficient to withstand the tensioning forces subsequently to be applied to the cloth.

Figure 10:
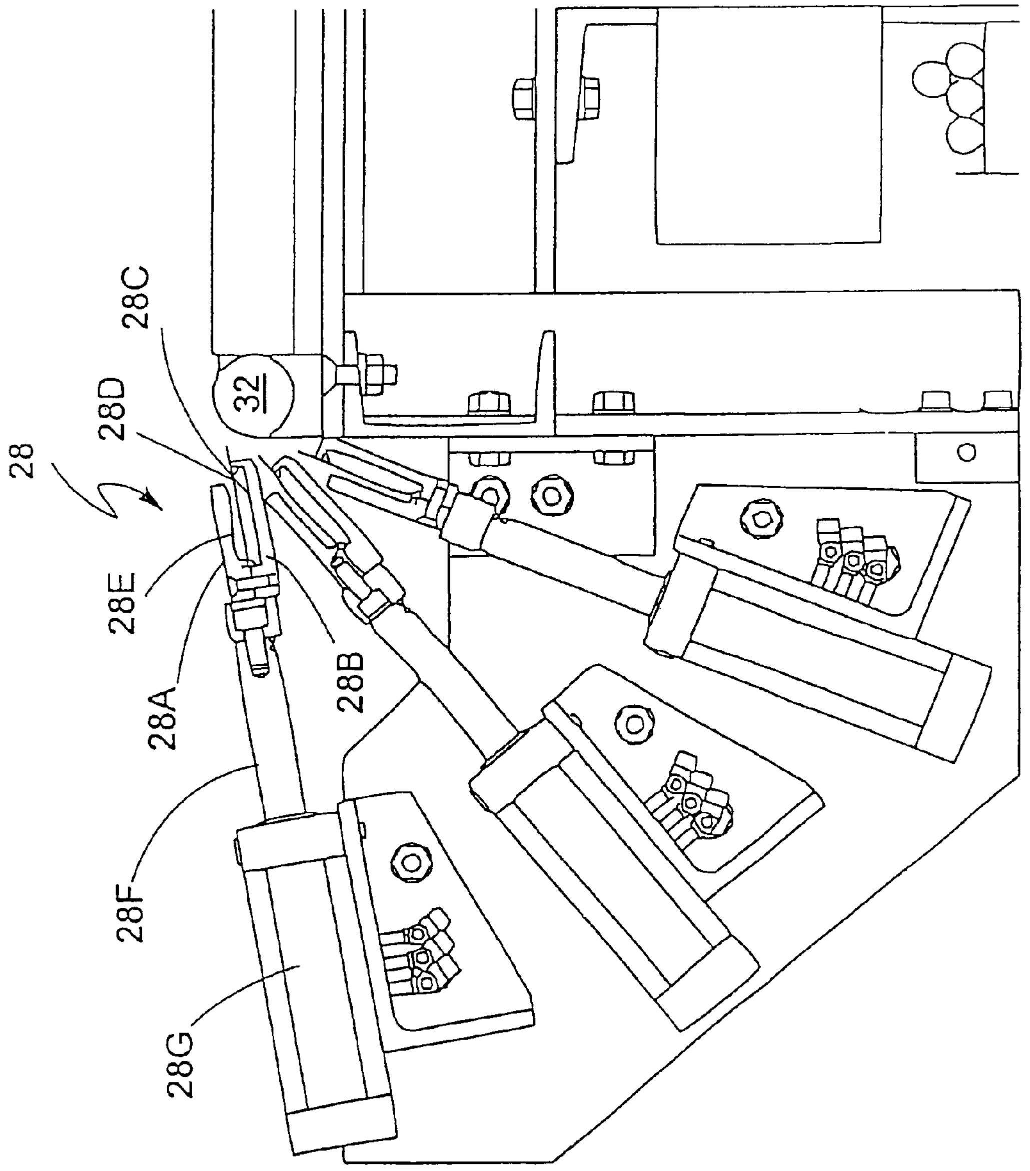
Figure 10B:
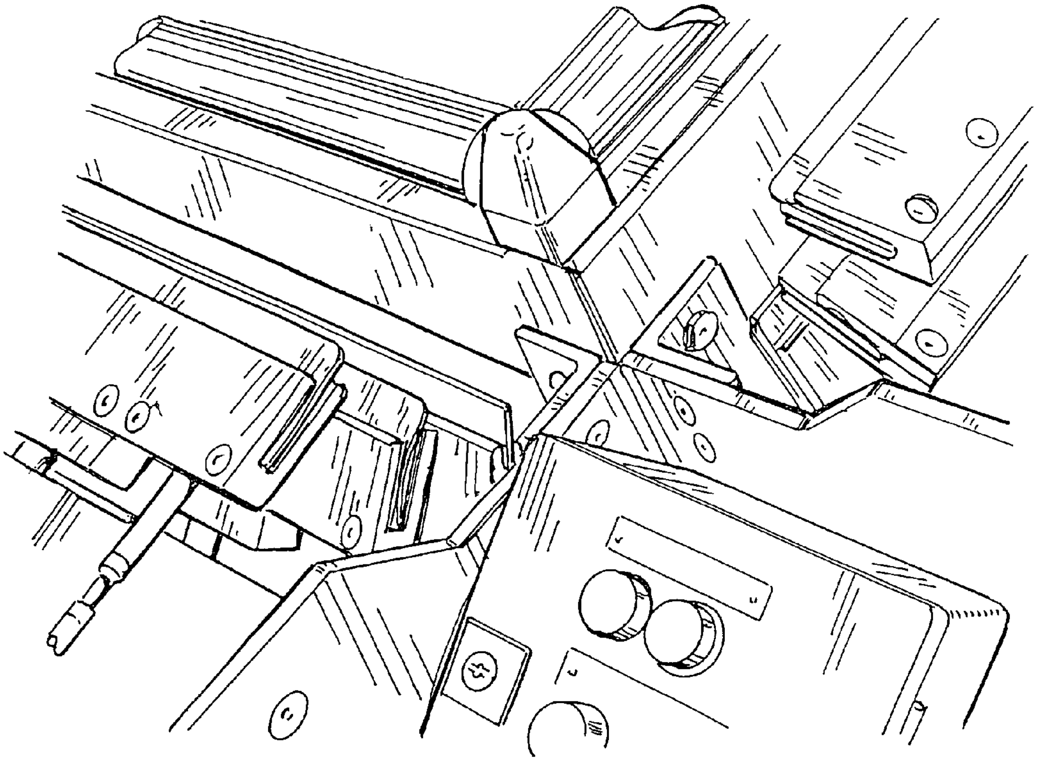
Figure 10A:
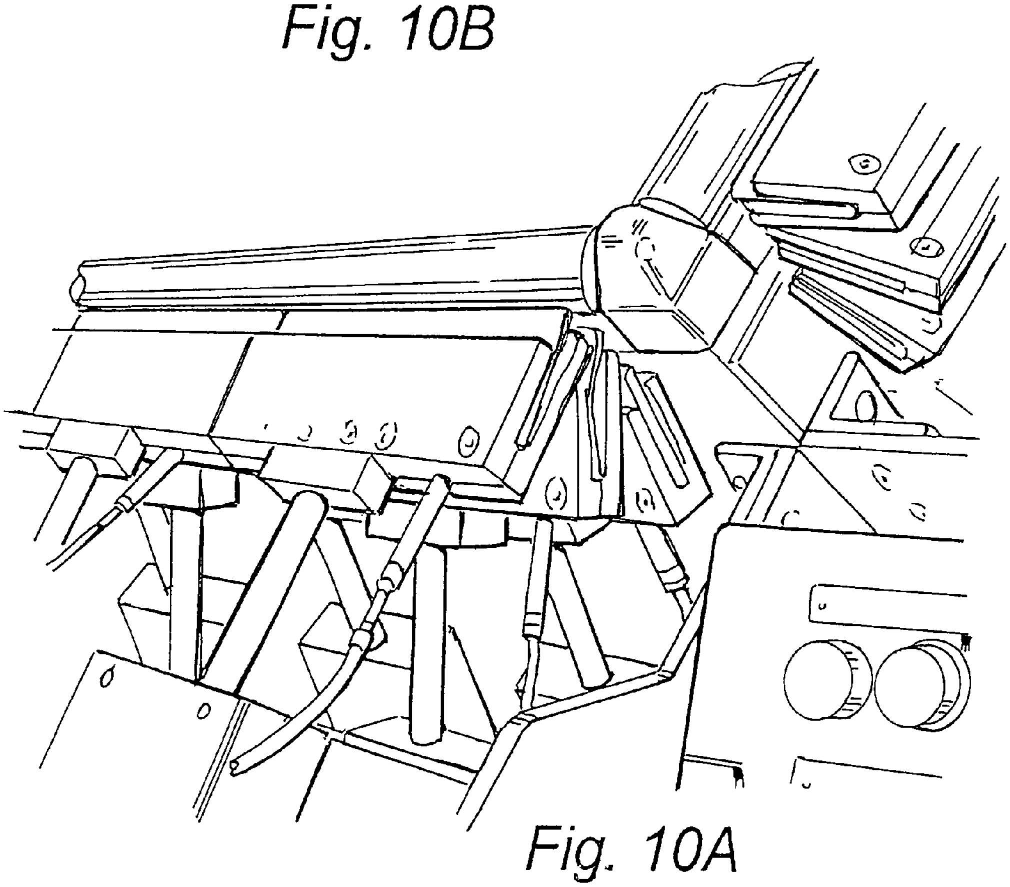

As best seen in FIGS. 10A and 10B the rear edge of each aluminium plate 28D is upturned to form a lip which engages in a groove in the underside of the upper jaw 28A near the rear edge thereof.

In order to enable cloth tensioning, jaws 28A, 28B are joined at their rear to form a single assembly carried by the piston 28F of a double acting pneumatic cylinder 28G. The double acting pneumatic cylinder and piston 28G, 28F constitute a tensioning device and there is one such device for each clamp unit. Supplying air to the forward end of the cylinder 28G forces the piston rearwardly, and thereby the jaw assembly, back away from the jig to stretch the gripped cloth over the breaker bar 32 at the periphery of the jig. Supplying air to the rear end of the cylinder moves the jaw assembly forward to its rest position nearer the jig as shown in FIG. 10A. This is effected after the cloth has been bonded to the frame and the jaws released, as later described. The breaker bar 32 prevents any local rippling of the wire cloth during tensioning.

In practice, it will be understood that all four edges of a wire cloth are gripped prior to tensioning, as will be clear from later description.

The pneumatic supply for the clamp units is later described with reference to FIG. 11.

Three layers of clamp units 28 are provided, to allow up to three cloths to be laid over and secured to the frames.

Three lines of clamp units 28 (such as can be seen in FIGS. 10, 10A and 10B) are provided on all four sides of the cradle, and a master control panel 30 (see FIGS. 5 & 6) is provided at one corner, and three slave control panels 30A, 30B and 30C are located at the other corners, so that an operator can control the clamps and tensioning devices along successive sides of the cradle individually, by simply moving from one side to the next around the assembly station.

Having gripped all four edges of a wire mesh cloth between the clamp unit jaws, the latter are pneumatically driven outwardly of the jig by means of the aforesaid cylinder and piston devices, in order to tension the cloth over the two frames. Each tensioning device, constituted by the aforesaid double acting pneumatic cylinder and piston, is operable independently, to stretch the cloth over the breaker bars 32 extending along the four edges of the jig cradle, whereby to ensure that the cloth is uniformly tensioned without ripples or creases.

The process is repeated for each layer of cloth, the edges of the first cloth being located in the jaws of the lowest of the three lines of clamp units 28, the edges if the next layer of cloth in the next line of clamp units, and so on.

Figure 2:
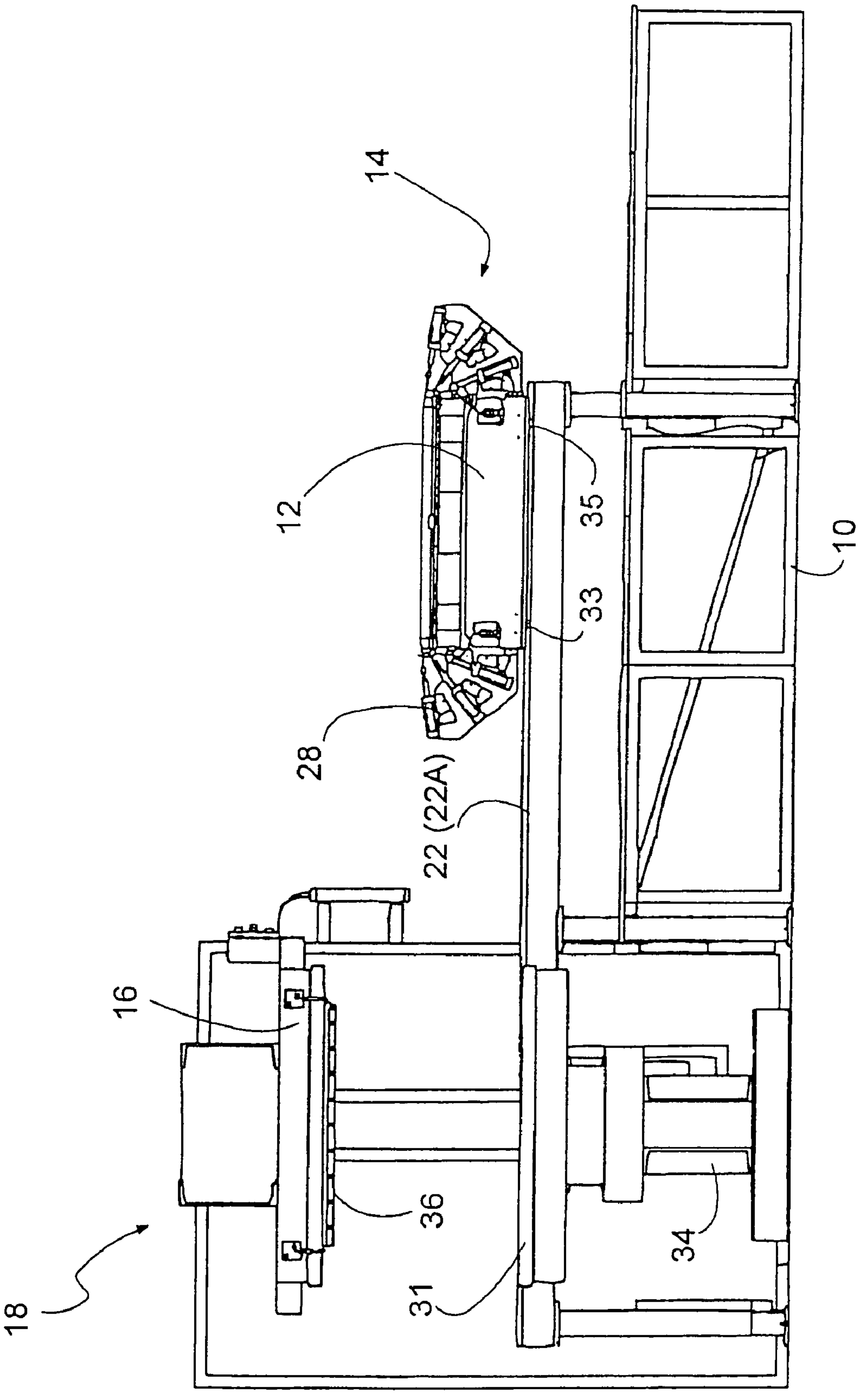
Figure 5:
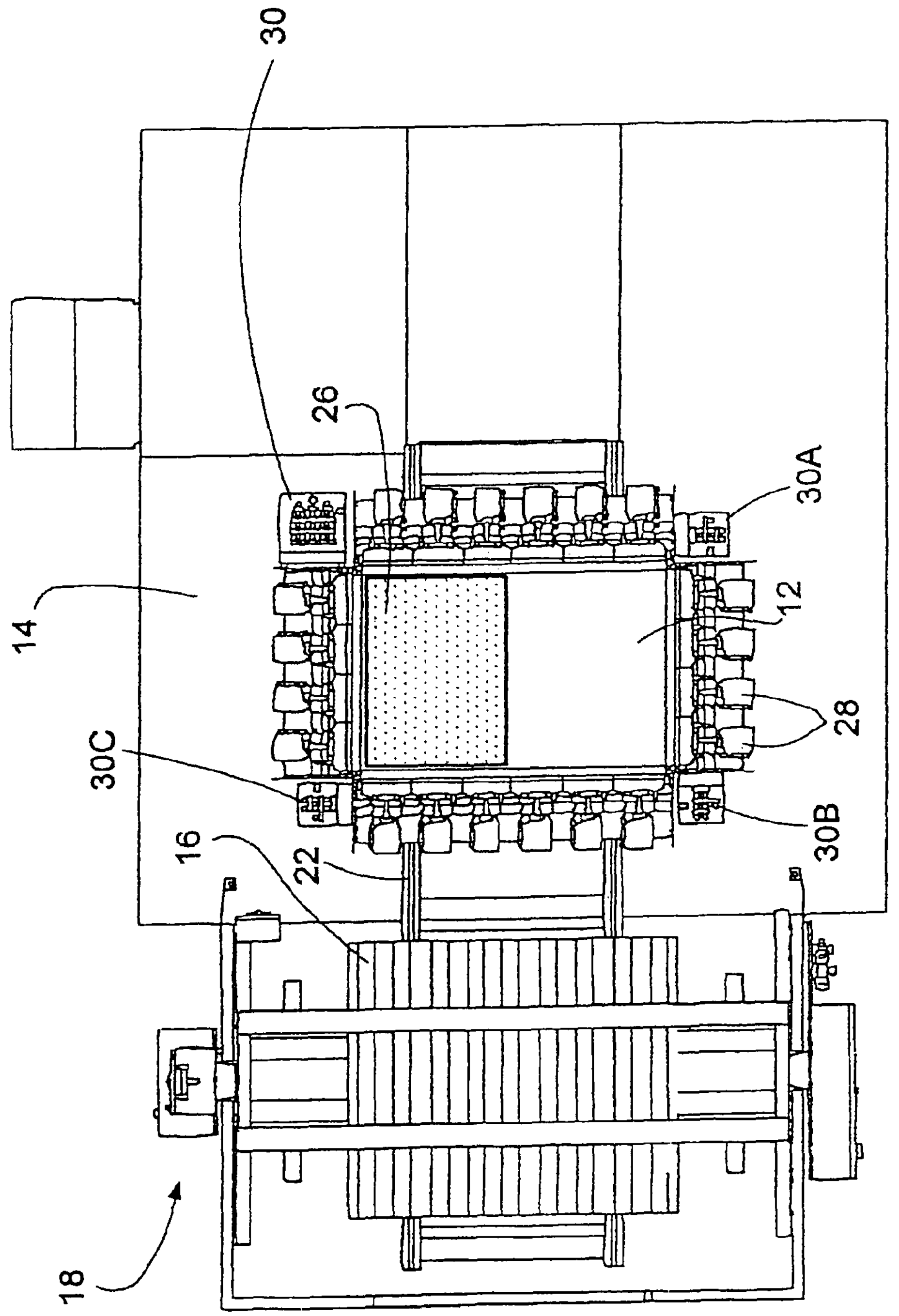
Figure 6:
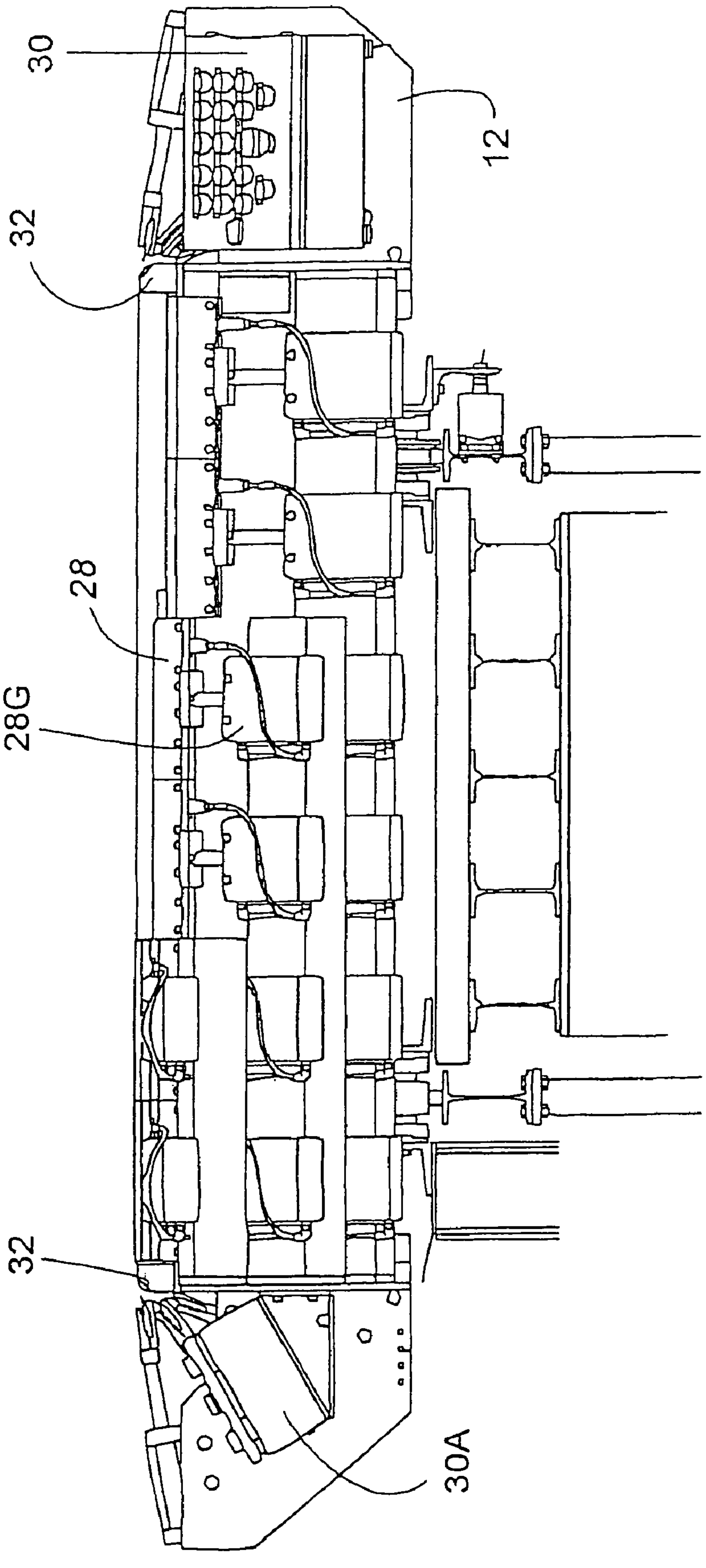
Figure 9:
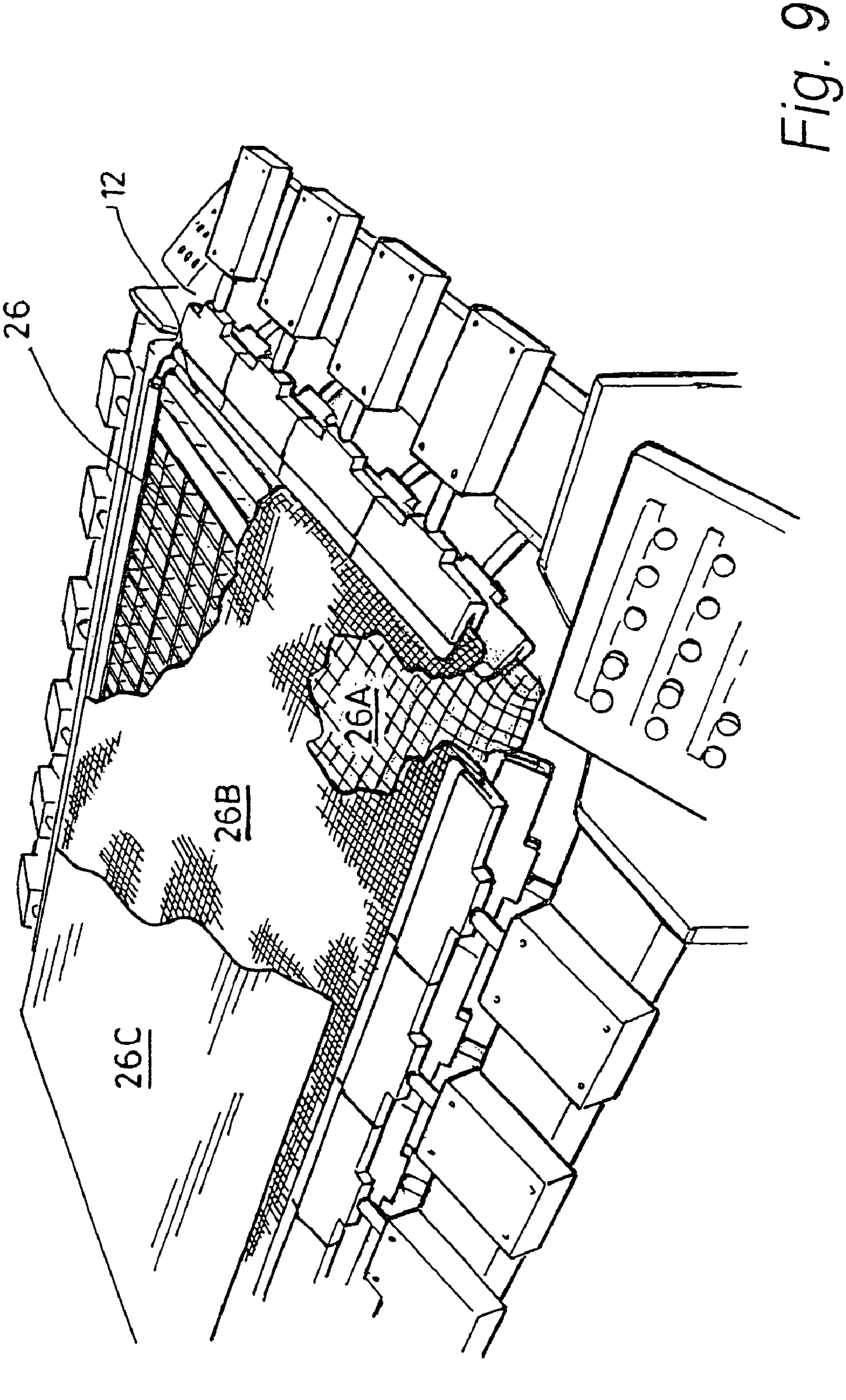

The complete cradle can then be moved to the bonding station, under the heating platen on the unit 16, best seen in FIGS. 2 and 5. First, however, before bonding, in order to prevent direct contact between the upper screen cloth and the heating platen, a heat resistant non-stick fabric, e.g. PTFE glass fabric, is laid over the tensioned cloth in the jig cradle. If desired the edges can be gripped by a line of clamp units. FIG. 9 shows the jig 12 with the two frames 26 located therein, upper and lower wire mesh cloths 26A and 26B cut away in part, stretched over the frame, and the release fabric 26C, also cut away in part, laid over the cloths.

At the bonding station, the jig is raised and lowered by a platform 31 acted on by a hydraulic ram 34, the platform 31 engaging the underside of the jig 12 to lift it, and in so doing lifting the wheels 33, 35 off the rails 22, 22A. On being raised the cloth on the screens is brought into contact with the platen 36, which is pre-heated by an electric heating element (not shown).

The heated platen softens the ridges on the upper edges of the interstices and the side flanges of the plastics frames, and the warp and weft wires of the tensioned cloths are pressed into the softened material. The ridging of the side flanges, and interstices aids the bonding process, as described in the aforementioned published International Patent Specifications.

After bonding the screen assembly is then lowered and moved back to the assembly station.

Back at the assembly station, the PTFE release fabric is stripped off, the tension on the cloths is released, the screen cloths are cut between the two frames, each frame is removed from the jig, and the protruding edges of the wireloth are trimmed back to the edges of the frames by for example using an angle grinder. Manufacture of the screens is then complete, and the jig is now ready to receive the next two frames and layers of cloth to make the next two screens.

Figure 11A:
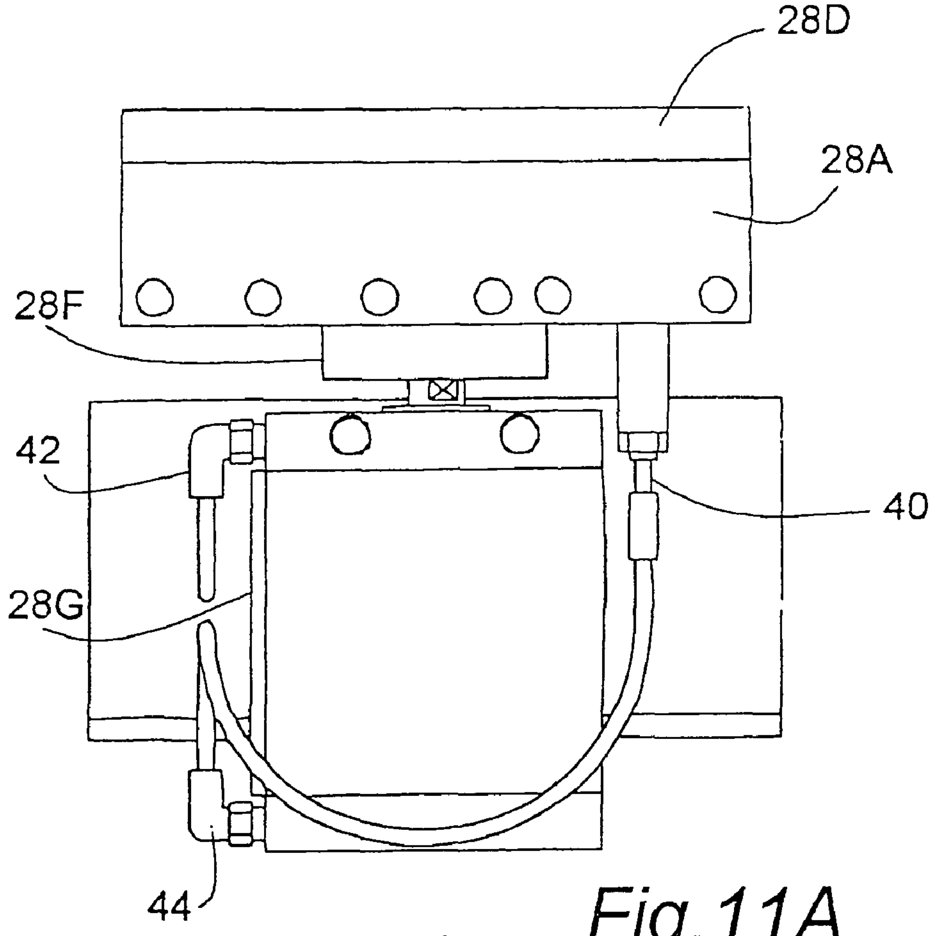
FIG. 11 shows the pneumatic connections for the clamps on the jig.
Figure 11B:
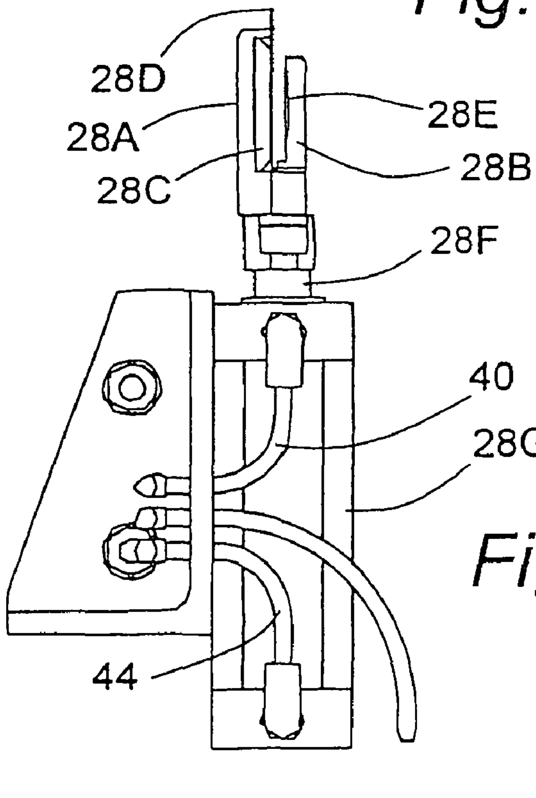

For completeness, FIGS. 11A and 11B show the air supply lines to the clamp units. Air for inflating the envelope 28C in the jaws 28A, 28B is supplied through air line 40. Complete evacuation of the envelope is required fully to open the space between the jaws prior to insertion of the edges of a fresh wire mesh cloth and this is achieved by applying vacuum to line 40.

Air for operation of the double acting cylinder 28G is supplied through air lines 42, 44. Supplying air through line 42 drives the piston 28F, and thus the clamp, outwardly of the jig in order to tension a wire mesh cloth clamped between the jaws. Supplying air through line 44 drives the clamp back towards the jig at the end of the operational sequence, so that the clamps are back in the positions shown in FIG. 10A ready to receive the next screen cloths for bonding to the next pair of frames.

Figure 12:
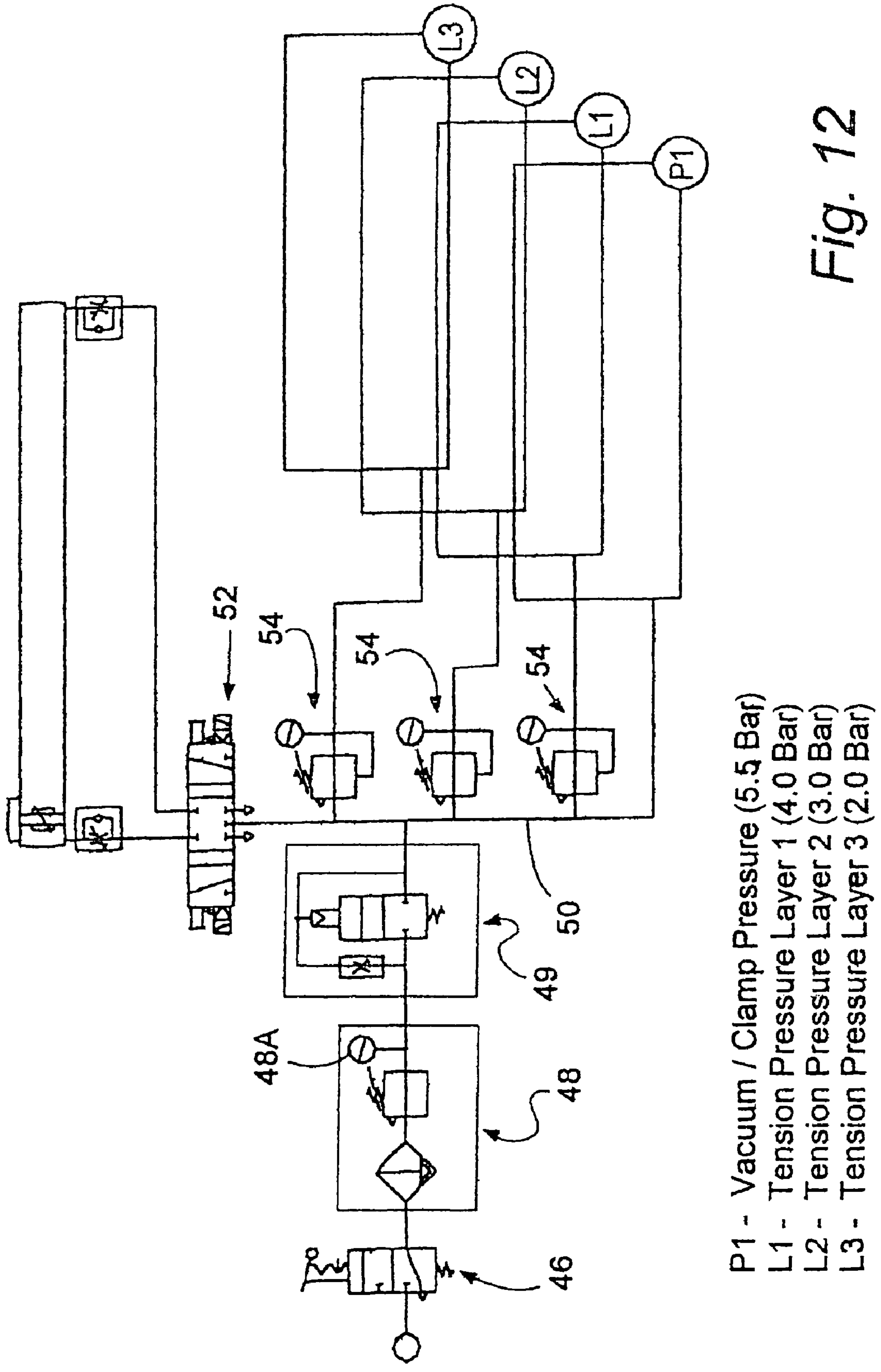
FIGS. 12, 13 and 14 are diagrams showing the pneumatics for the cloth clamping and tensioning system of the apparatus.

The pneumatic control circuit for the clamps and tensioning devices is shown in FIG. 12.

Air under pressure is supplied via an on/off valve 46 to a pressure adjustable valve 48 and associated pressure meter 48A and thence through a filter and valve unit 49 to a pressure line 50 from which air can be supplied via a pneumatic switching circuit 52 to operate the clamps and tensioning devices. The switching circuit is controlled by buttons on the control panels at the corners of the jog, those buttons being respectively labelled L3, L2, L1 and P1 in the drawing. Each line pressure for the clamp and tensioning devices is adjustable by means of pressure adjusters and associated meters 54. A typical line pressure P1 for operating the clamps may be 5.5 bar, and typical tensioning pressures may be 4.8 bar (L3) for the uppermost layer of tensioning devices, 3.0 bar (L2) for the intermediate layer and 2.0 bar (L1) for the bottom layer. There may, of course, be only one or two wire mesh cloths applied in the manufacture of any particular screen, in which case some of the buttons for the unused layers of tensioning devices will not be operated. The exemplary line pressures mentioned for the tensioning devices are given assuming all three layers of tensioning devices are to be used. The valves employed in the pneumatic control circuit are all solenoid valves.

Figure 13:
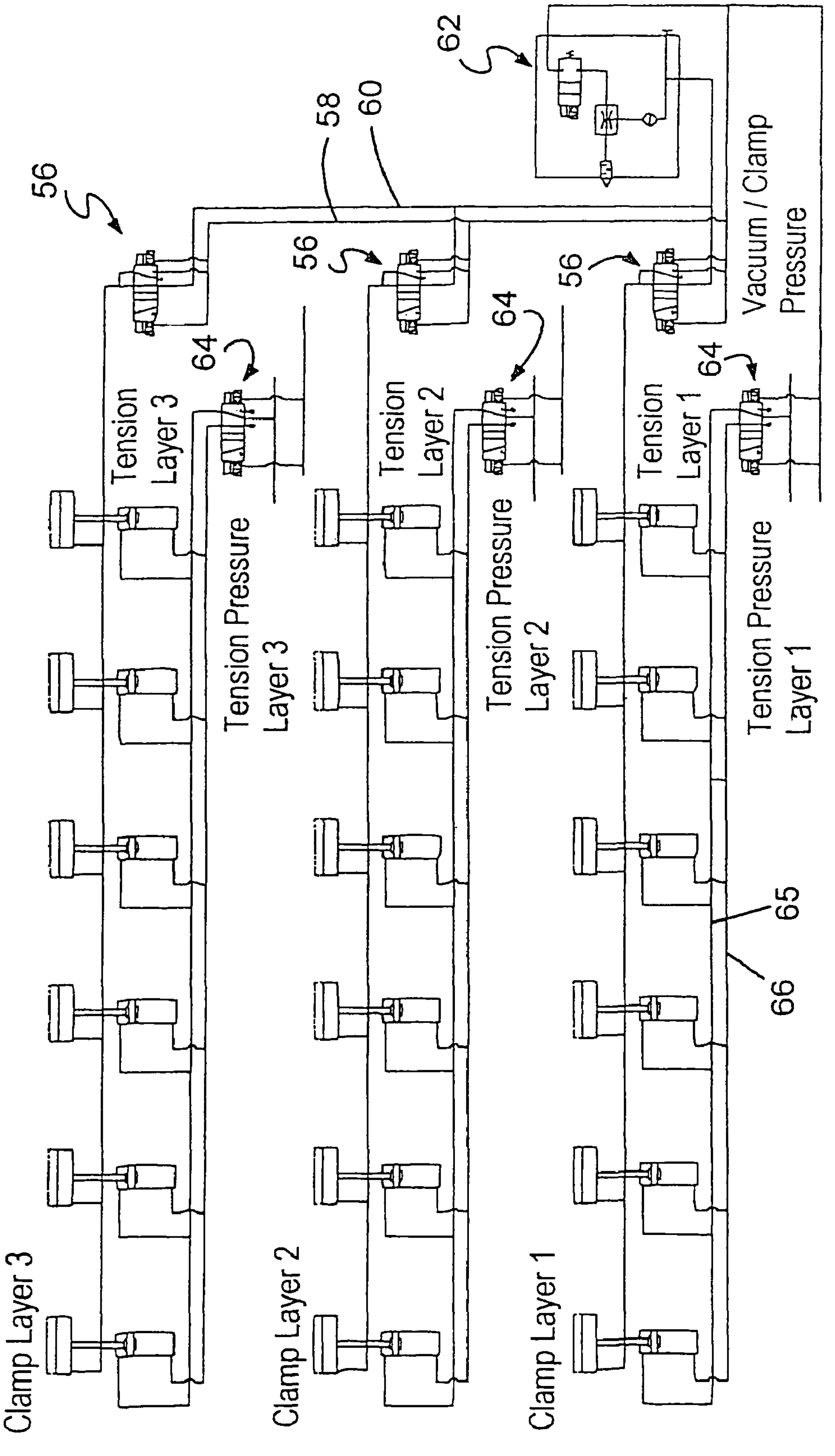
Figure 14:
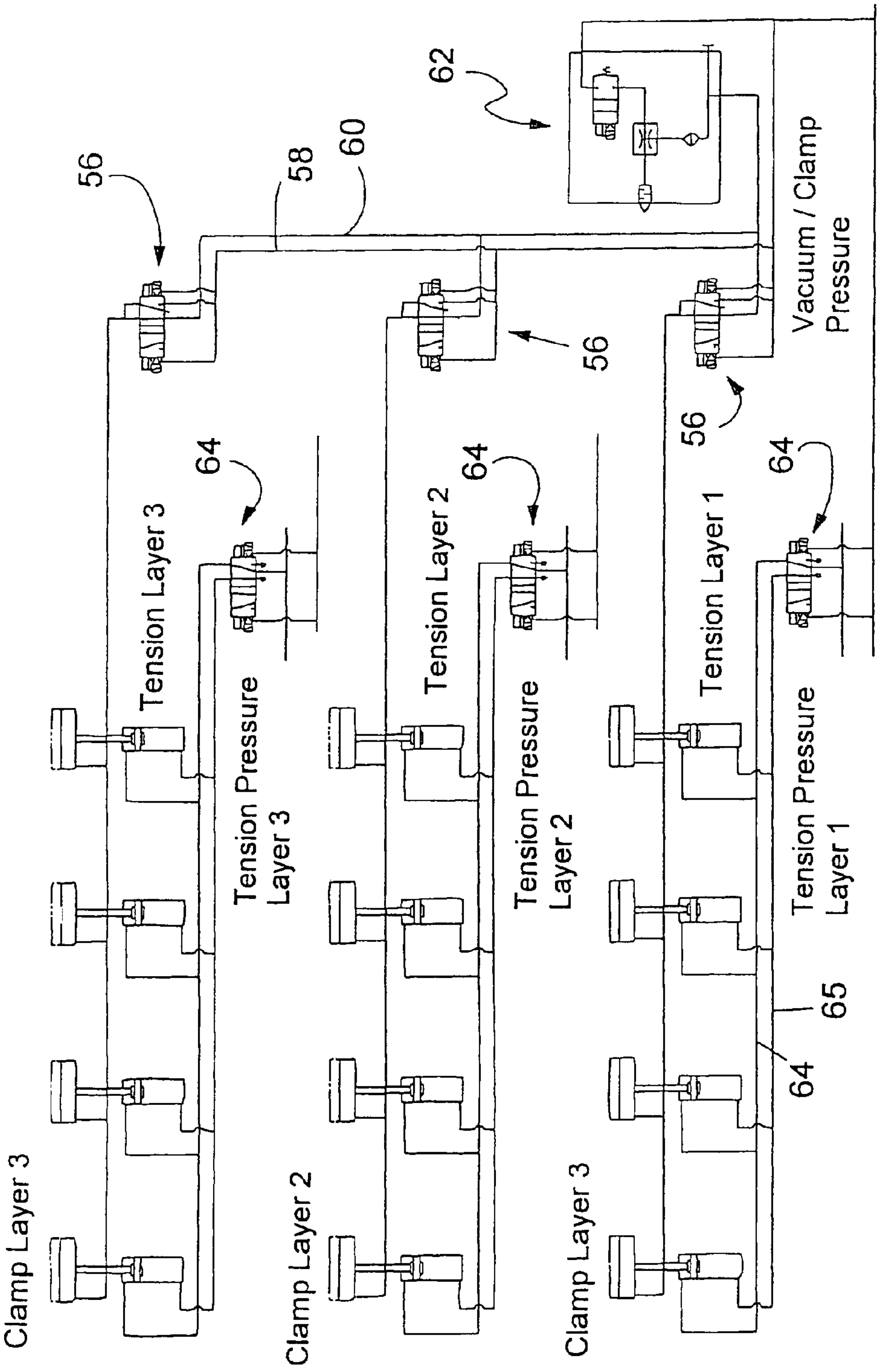

FIGS. 13 and 14 show the set up of the pneumatics for the clamp units. First, it has to be understood that the frames to which the wire mesh cloths are to be bonded are rectangular, with two shorter sides A and B and two longer sides C and D. The two frames are located in the jig with their shorter sides A and B in line, thus requiring six clamp units along each of the aligned edges, (twelve in all) for a cloth laid over both frames. Four clamp units are provided along each longer side of the frames at opposite ends of the jig (eight in all).

FIG. 13 shows the set up for six clamp units along one side of the jig; this set up is repeated for the other side.

FIG. 14 shows the set up for the four clamp units along the longer ends of the jig. The set up of FIG. 14 is also repeated at the opposite end. In both figures, the set up is shown for the clamp units in all three layers.

In both of FIGS. 13 and 14 switching valves 56 control the inflation and collapse of the envelopes in the clamps through lines 58 and 60. Venting the envelopes to atmosphere via 60 releases the cloths to allow their edges to be removed. Applying vacuum to 60 by using 62, collapses the envelopes to facilitate the insertion of new cloth between the clamping jaws.

Valve units 64 control the supply of air to the pneumatic cylinder tensioning devices through lines 64, 65, line 64 for tensioning and line 65 for untensioning.

Figure 15:
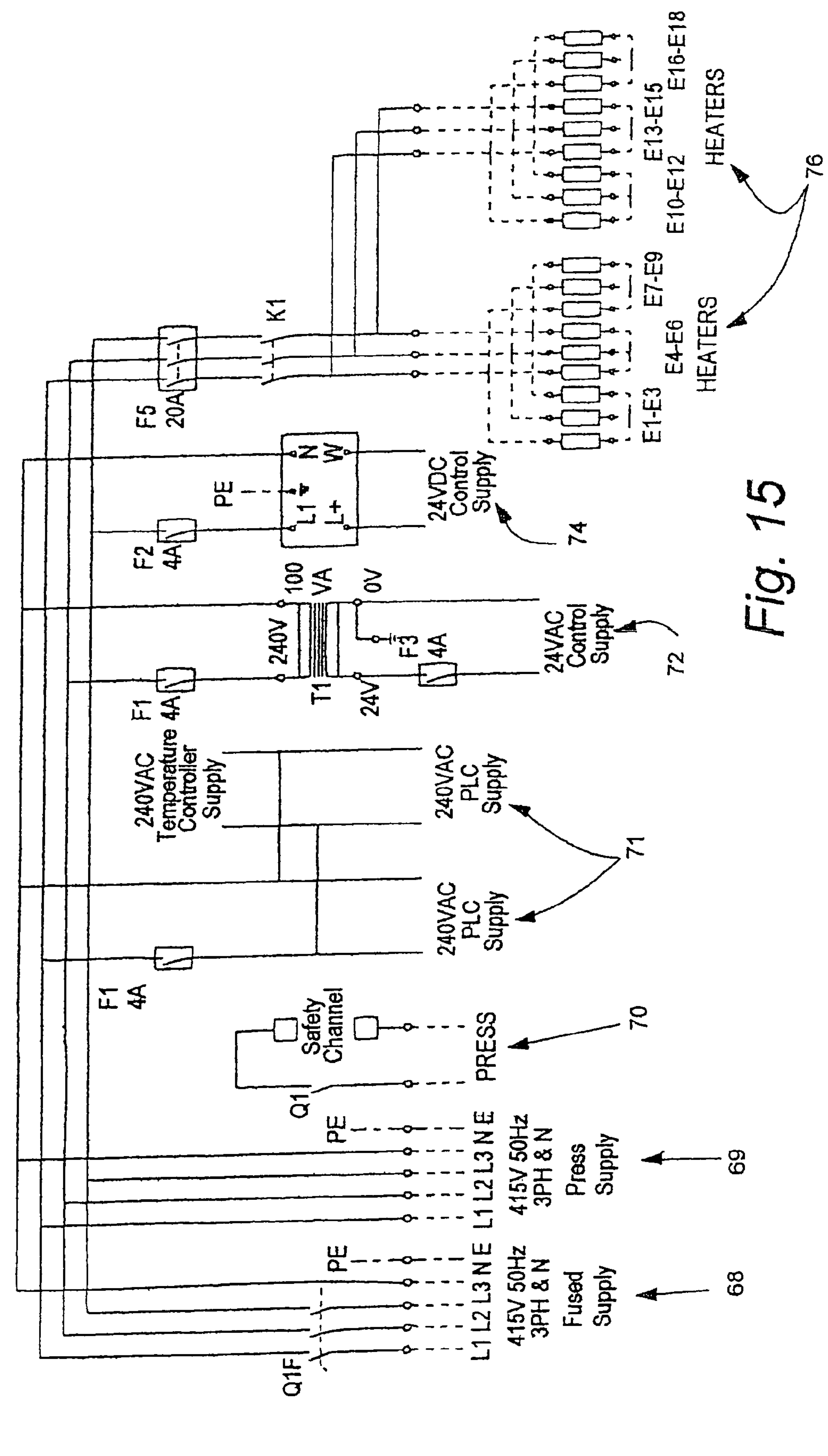
FIG. 15 is a diagram showing the electrical supply circuits of the apparatus.

In FIG. 15, reference 68 indicates the fused electrical power input terminals; reference 69 indicates the power supply to the motor driving an oil pump for supplying hydraulic oil under pressure to the ram which lifts and lowers the cradle at the bonding station; reference 70 indicates the power supply to a photoelectric safety circuit which is provided to stop and reverse the hydraulic drive if a light beam in the path of the cradle across the entrance to the bonding station is, interrupted for any reason while the cradle is being lifted towards the heating platen; reference 71 indicates the power supply enabling computer control of the sequence of the operating procedure of the apparatus; reference 72 indicates the power supply for all AC solenoid valves employed in the pneumatic circuits and reference 74 is the power supply for all DC solenoid valves, and reference 76 indicates the power supply to the heater used in heating the platen at the bonding station.

Figure 16:
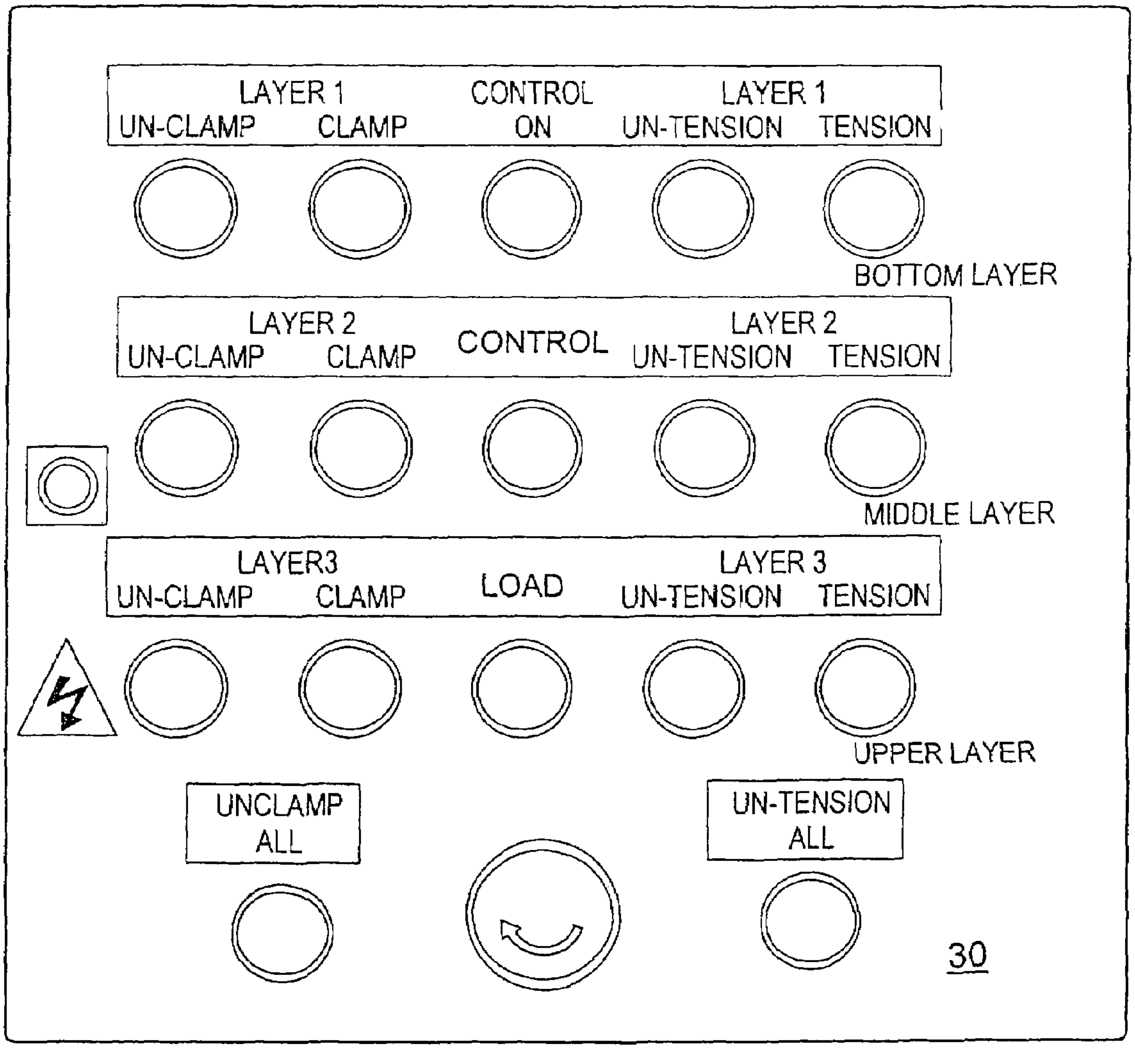
FIGS. 16 and 16A show control panels for the apparatus.
Figure 16A:
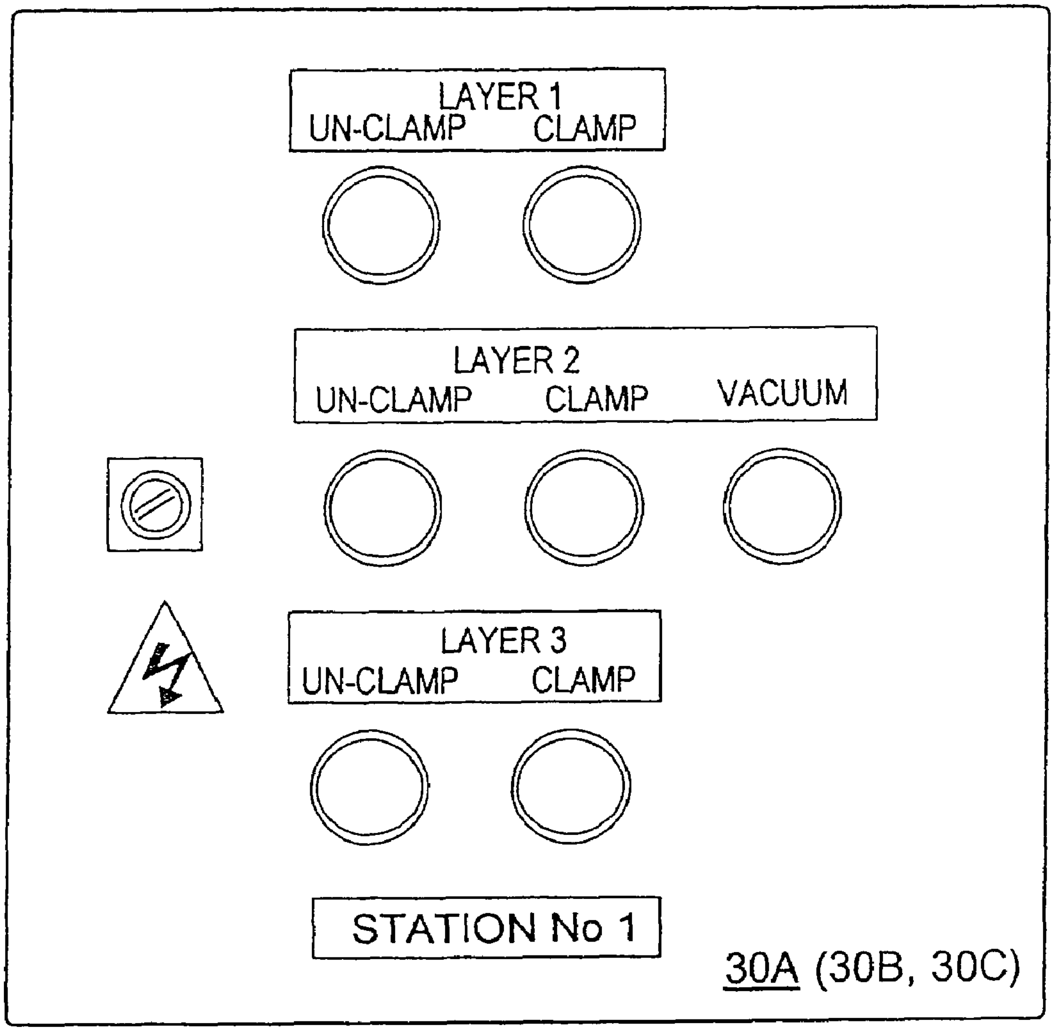

Finally FIGS. 16 and 16A respectively show the master control panel 30 at one corner of the jig, and one of the secondary (or slave) control panels 30A, 30B, 30C at one of the other corners of the jig. The buttons are marked with their functions.

The main panel 30 and each secondary panel 30A, 30B, 30C provides for clamping, unclamping and evacuation of the clamp envelops, along the first, second, third and fourth sides of the jig respectively, if appropriate for all three layers of cloth.

The main control panel 30 additionally provides for tensioning and untensioning along all four sides of the jig, including the first side, which is where the operator starts the loading of the jig. Thus, the operator, having first located the edge of a cloth in the clamps along the first side of the jig, uses the main control panel 30 to operate those clamps to clamp that edge, and then moves round the jig to clamp the edges of the cloth in sequence on the second, third and fourth sides. This brings the operator back to the main control panel, at which the appropriate tensioning button can be pressed to operate all the pneumatic cylinder tensioning devices simultaneously so all the clamps for one layer are moved outwardly at the same time, thus tensioning the cloth appertaining to that layer.

When loading has been completed and the cradle moved back to the assembly station, the operator can use the main control panel 30 first to apply pressure to reverse all the tensioning pneumatic cylinders of all the cloth layers.

All the clamping can be released by evacuating all the inflated envelopes to atmosphere, and the latter can be flattened to assist in inserting more wire cloth edges, by applying vacuum to all the envelopes.

It is important to note that, during tensioning, the same air pressure is applied to the pistons of the pneumatic tensioning devices and these may not all move exactly equally, but each will move to the extent necessary to tension all parts of the relevant cloth to the predetermined and preset extent.

The invention claimed is:

1. A method of manufacturing a filtering screen comprising the steps of:

(1) locating a frame of plastics coated metal or reinforced plastics material in a jig, (2) placing at least two wire cloths over the frame, (3) individually gripping the edges of the cloths by pneumatically operated clamps carried by the jig, (4) driving the clamps pneumatically outwardly of the frame to tension each cloth in orthogonal directions, (5) pressing the tensioned cloth against the frame, (6) heating the cloths in order to bond them to the frame, (7) allowing the heated material to cool, (8) releasing the clamps after completion of the bonding step, (9) removing the frame from the jig, and

(10) trimming back the at least two wire cloths to the edges of the frame as necessary, and wherein the heating and pressure is provided by a heated platen and the at least two wire cloths are protected from direct contact with the heated platen by placing a layer of heat resistant non-stick fabric over the upper cloth prior to the bonding step, and removing the fabric on completion of the bonding step.

2. A method as claimed in claim 1 wherein the plastics material of the frame is polypropylene reinforced with glass fiber.

3. A method as claimed in claim 1 wherein a separate set of pneumatically operated clamps is provided for gripping all four edges of each wire cloth layer and a separate cloth tensioning means is provided for the clamps along at least two adjacent sides of each cloth layer, whereby in use the wire cloths are individually, and if required, differentially, tensioned as, appropriate for the use to which the screen is to be put, prior to being collectively bonded to the frame.

4. A method as claimed in claim 1 wherein the step of clamping and tensioning of the cloths is performed at a first station remote from a second station at which the heating and bonding occurs, so that the clamping and tensioning step can be performed away from a region containing a source of heat.

5. A method as claimed in claim 4 wherein the heating and pressure is provided by a heated platen and the at least two wire cloths are protected from direct contact with the heated platen by placing a layer of heat resistant non-stick fabric over the upper cloth prior to the bonding step, and removing the fabric on completion of the bonding step, and wherein at least one frame is loaded into a jig cradle which, after the cloths have been clamped and tensioned, is conveyed to the second station containing the heated platen.

6. A method as claimed in claim 5 wherein the jig cradle and the heated platen are moved relatively vertically, to sandwich the cloths between the frame and the platen, to heat the frame and force the cloths into the frame.

7. A method as claimed in claim 6 wherein a hydraulic ram is employed to elevate the jig cradle and then squeeze the mesh between the heated platen and the frame, and the hydraulic pressure applied to the ram is in the range 500 to 2000 psi to effect the squeezing force.

8. A method as claimed in claim 5 wherein at the end of the heating and bonding step, the jig cradle and heated platen are separated to allow the material to cool and cure, the jig cradle is conveyed back from the second station to the first station, where the tension and then the clamps are released, the protective fabric is removed and thereafter the frame is removed from the jig cradle, and any cloth extending beyond the edges of the frame is trimmed back to the edge of the frame and the rough edges are ground smooth using an angle grinder or the like.

9. A method as claimed in claim 1 wherein the clamps of any one layer are movable outwardly of the frame individually and independently of each other, and each clamp has its own independently operable tensioning mechanism, so that any localized slack in the cloth can be taken up.

10. A method as claimed in claim 1 wherein a breaker bar is located immediately in front of each line of clamps along each side of the frame, and the first layer of cloth is laid over the bar and moves over it as the cloth is tensioned, thereby to remove any ripples in the cloth, and the other layer or layers of cloth are laid over the first and similarly tensioned over the breaker bar, with the previous layer or layers of cloth sandwiched between the bar and the latest layer of cloth to be applied.

* * * * *